May 8, 1956  J. R. SIBLEY  2,744,614
TENSION MAINTAINING ARRANGEMENT FOR A CONVEYOR CHAIN
Filed March 1, 1954  2 Sheets-Sheet 1
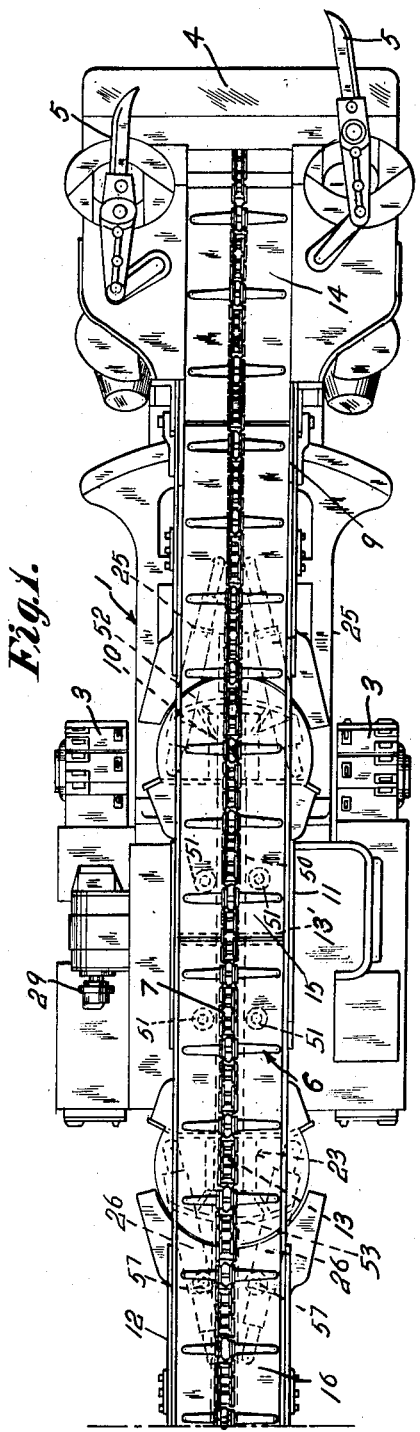
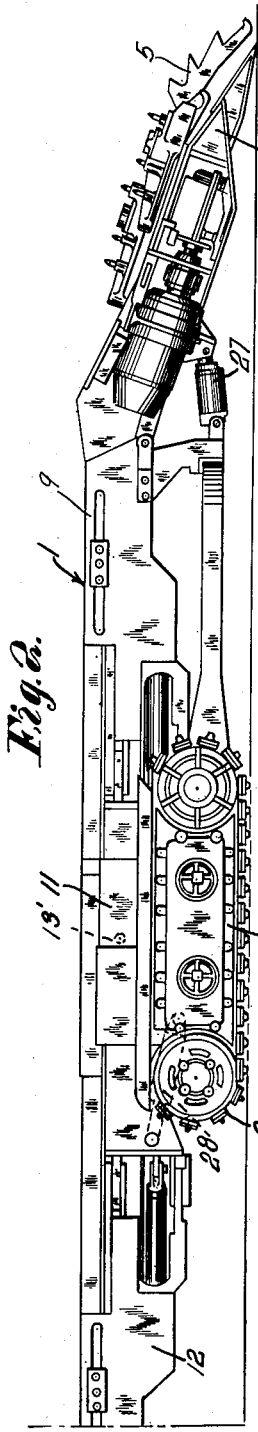
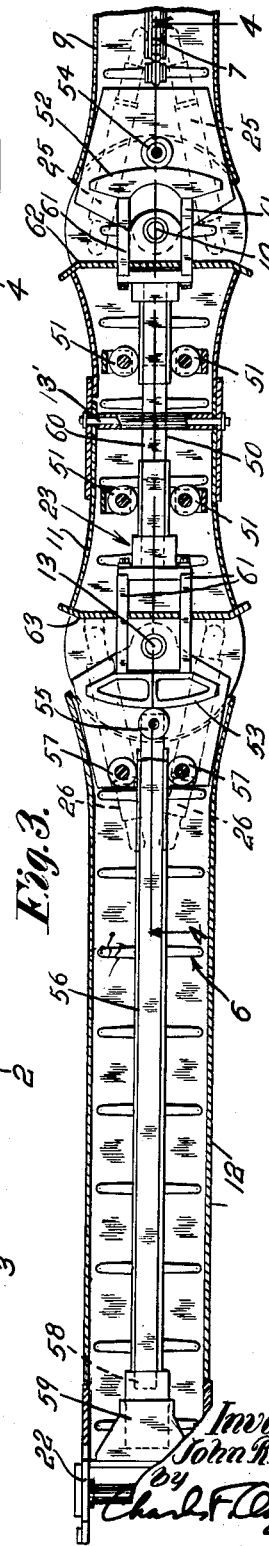
Inventor
John R. Sibley
by
Charles F. Osgood
attorney.

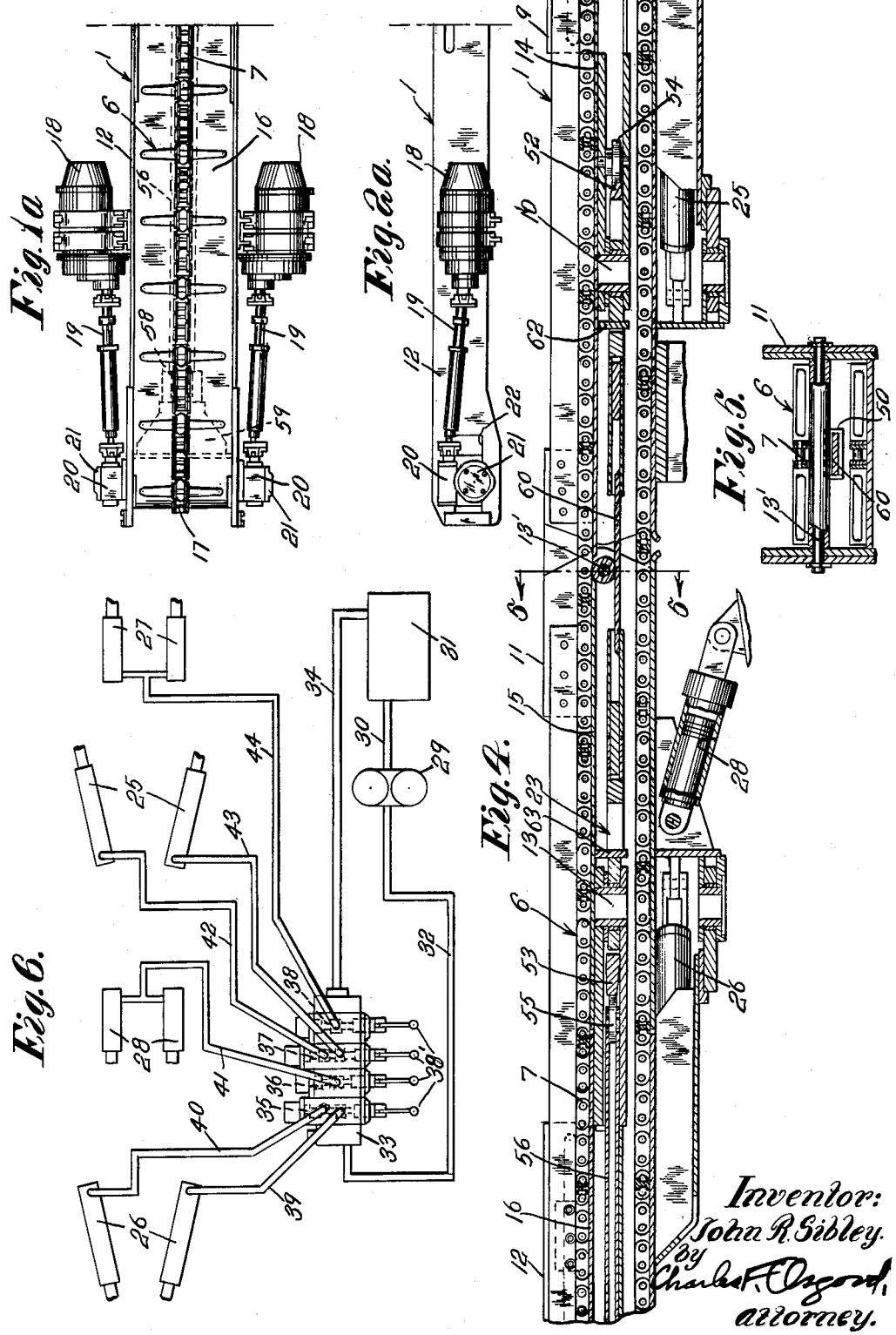

United States Patent Office 2,744,614
Patented May 8, 1956

2,744,614

TENSION MAINTAINING ARRANGEMENT FOR A CONVEYOR CHAIN

John R. Sibley, Sugarcreek Township, Venango County, Pa., assignor to Joy Manufacturing Company, Pittsburgh, Pa., a corporation of Pennsylvania Application March 1, 1954, Serial No. 413,101

23 Claims. (Cl. 198—109)

This invention relates to conveyors and more particularly to a tension maintaining arrangement for a chain type conveyor for automatically taking up any slack introduced in the conveyor chain during lateral swing of either end portion of the conveyor.

In chain conveyors of known types such as those commonly employed in mining machines, as for an example in a mobile loading machine, one or both of the end portions of the conveyor may be swung laterally and during such lateral swinging of the conveyor portions, slack is introduced in the conveyor chain which must be taken up to provide for the maintenance of substantially uniform tension of the conveyor. Heretofore, various types of conveyor take-ups have been employed such as spring take-up devices and cam and pusher devices, and one of the latter devices is disclosed in a patent to John Merck, No. 2,613,800, dated October 14, 1952, owned by the same assignee as the present invention. In this Merck patent a mechanical cam and pusher device is arranged between the upper and lower runs of the rearward swingable portion of the conveyor and acts on the rear portion of the conveyor chain, as the rear discharge portion of the conveyor is swung laterally, to take up any undesired slack in the chain. The present invention contemplates improvements over such known types of conveyor take-up arrangements in that substantially uniform tension on the conveyor chain is automatically maintained by a mechanical take-up arrangement acting on one end portion of the conveyor for automatically taking up any slack in the conveyor chain irrespective of whether the front end portion, the rear end portion, or both end portions of the conveyor are swung laterally.

The present invention, from one aspect, is directed to an automatic take-up arrangement for maintaining substantially uniform tension in a conveyor chain during lateral swing of the front and rear end portions of the conveyor about longitudinally spaced, parallel upright pivotal axes with all tension adjustment being effected at one end portion of the conveyor. This tensioning arrangement may include a double cam thrust member guided on a relatively fixed central portion of the conveyor frame between the upper and lower runs of the conveyor at the longitudinal center thereof, and actuated by a roller on the swingable front conveyor portion and acting on the adjacent end cam of the double cam thrust member, with the cam at the opposite end of the thrust member engaging a roller on a second thrust member also lying between the upper and lower runs of the conveyor at the longitudinal center thereof and swingable laterally with the rearward conveyor portion and acting on the rear end portion of the conveyor. Thus, the conveyor chain is mechanically maintained under substantially uniform tension irrespective of the laterally-swung positions of the opposite end portions of the conveyor.

An object of the present invention is to provide an improved conveyor tensioning arrangement. Another object is to provide an improved conveyor having laterally swingable end portions and improved tensioning means acting on one end portion of the conveyor chain for automatically maintaining the latter under substantially uniform tension irrespective of the laterally-swung positions of the opposite end portions of the conveyor. Still another object is to provide an improved mechanical tensioning arrangement acting on one end portion of the conveyor chain for maintaining the chain under substantially uniform tension as the opposite end portion of the conveyor is swung laterally. These and other objects and advantages of the invention will, however, hereinafter more fully appear.

In the accompanying drawings there is shown for purposes of illustration one form which the invention may assume in practice.

In these drawings:

Figs. 1 and 1a, taken together, constitute a plan view of a mobile loading machine equipped with a preferred illustrative embodiment of an improved automatic take-up for a conveyor chain.

Figs. 2 and 2a, taken together, constitute a side view of the machine shown in Figs. 1 and 1a.

Fig. 3 is a horizontal section taken longitudinally through a major portion of the conveyor, showing details of the conveyor take-up.

Fig. 4 is an enlarged central longitudinal vertical section taken on line 4—4 of Fig. 3.

Fig. 5 is a cross section taken on line 5—5 of Fig. 4.

Fig. 6 is a diagrammatic view illustrating the hydraulic fluid system.

In this illustrative construction, as shown in the drawings, the improved conveyor is associated with a mining machine as for example, a mobile loading machine generally designated 1. This loading machine generally comprises a tractor base 2 mounted on crawler treads 3 which may be separately or simultaneously driven to effect propulsion and steering of the machine, in a well-known manner. A conventional loading head 4 is tiltably mounted on the base and embodies oscillatory gathering arms 5 for gathering loose material on the mine floor and for moving the material so gathered onto an endless conveying means which is generally designated 6. The conveying means includes a conveyor of the endless flight type comprising a central drive chain 7 of the universal type having transverse flights secured thereto at intervals along its length. The conveying means also includes a forward trough-like frame or frame section 9 swingable laterally with the loading head 4 about an upright pivotal axis 10, a central relatively fixed trough-like frame portion or section 11 mounted on the frame of the tractor base, and a rearward trough-like frame or frame section 12 swingable laterally relative to the base about an upright pivotal axis 13. The base has a forward projecting portion providing an arcuate guideway engaged by a guide on the swingable front frame 9 for guiding the latter during lateral swinging thereof, as shown in Figs. 1 and 2. As described in the Merck patent the trough sections each may have laterally flexible vertical side plates at the sides of the pivotal connections 10 and 13, in a well-known manner. The rearward portion of the rear conveyor frame 12 is tiltable about a transverse axis at 13' (Figs. 4 and 5) relative to the relatively fixed central frame portion 11 to vary the elevation of the rear discharge end of the conveyor and the forward portion of the conveyor is tiltable in vertical planes with the loading head.

The endless conveyor is guided for circulation relative to the front, central and rear frame portions or sections with the conveyor flights movable along the bottoms 14, 15 and 16 of these frame portions respectively, and the rearward portion of the conveyor chain at the discharge end of the conveyor passes around a drive sprocket 17 which is carried by a suitable cross shaft in the manner fully disclosed in the above-mentioned Merck patent, and this cross shaft is driven by motors 18 mounted at the sides of the rear frame section 12 of the conveyor and operatively connected through telescopic shafts 19 and speed reducers 20 to the opposite ends of the cross shaft. These speed reducers are contained within housings 21 guided for longitudinal adjustment in unison along longitudinal guideways 22 formed within the sides of the rearward portion of the rear conveyor frame 12. Associated with the three conveyor frame sections 9, 11 and 12 is the improved chain tensioning arrangement, generally designated 23. It will thus be seen that the front and rear frames 9 and 12 of the conveyor may be swung separately or simultaneously laterally about their respective pivotal axes to vary the operating positions of the front receiving end and the rear discharge end of the conveyor while the conveyor chain is always maintained under substantially uniform tension.

As shown diagrammatically in Fig. 6, a pair of forwardly located fluid jacks 25 effect the swing of the front conveyor frame 9 together with the loading head 4 relative to the base, and a pair of rearwardly located fluid jacks 26 effect lateral swinging of the rear conveyor frame 12. A pair of fluid jacks 27 serves to tilt the loading head 4 and a pair of fluid jacks 28 serves to tilt the rearward portion of the rear conveyor frame 12 about its pivot 13'. A motor-driven pump 29 has its suction side connected by conduit 30 to a liquid reservoir or tank 31 and the discharge side of the pump is connected by a conduit 32 to the pressure passage of a valve box 33 of a conventional control valve mechanism. The discharge passage of this valve box is connected by a return conduit 34 back to the tank. The valve box has usual parallel bores for receiving conventional slide valves 35, 36, 37 and 38 respectively, each having a suitable operating handle 38'. The bore containing the slide valve 35 is connected by conduits 39 and 40 to the rear swing jacks 26 while the bore containing the slide valve 36 is connected by a conduit 41 to the tilting jacks 28 for the rear conveyor frame. The bore containing the slide valve 37 is connected by conduits 42 and 43 to the front swing jacks 25 for the front conveyor frame and loading head, while the bore containing the slide valve 38 is connected by a conduit 44 to the tilting jacks 27 for the loading head. From the foregoing it is evident that the front and rear end portions of the conveyor may be tilted and swung laterally into different operating positions as desired.

Now referring to the improved automatic take-up arrangement for the conveyor chain, it will be noted that located centrally longitudinally of the relatively fixed intermediate frame portion 11 of the conveyor is a reciprocable thrust bar or pusher rod 50 guided for endwise movement at its side edges by pairs of longitudinally spaced side rollers 51 journaled on upright axes at the opposite sides of the pusher rod (Fig. 3). The pusher rod or bar has a front end cam 52 and a rear end cam 53 and these cams are located near the pivotal axes 10 and 13 respectively of the front and rear conveyor frames. The front cam 52 is engaged by a roller 54 journaled on an upright axis on the front conveyor frame 9 at the longitudinal median line thereof. The rear cam 53 engages a roller 55 journaled on an upright axis on the front end of a pusher bar 56 also lying between the upper and lower runs of the conveyor and extending centrally lengthwise of the swingable conveyor frame 12. This pusher bar is guided at its forward portion by a pair of side guide rollers 57 journaled on upright axes on the rear conveyor frame and the rear end of this pusher bar is suitably secured at 58 to a frame 59 connected to the sliding housings 21 for the speed reducers 20 through which the rear drive sprocket 17 is driven.

When the rear conveyor frame 12 is swung laterally about its pivot 13 the rear cam 53 acts on the roller 55 to force the pusher bar 56 rearwardly endwise thereby to move the rear drive sprocket 17 rearwardly to take up any slack introduced in the conveyor chain as the rear frame is swung laterally. Upon swinging of the front conveyor frame 9 the roller 54 acts on the front cam 52 to force the pusher bar 50 endwise rearwardly and through the latter, the cam 53 and roller 55, the coacting pusher bar 56 is moved rearwardly endwise to move the rear drive sprocket 17 to take up the undesired chain-slack. When the front and rear conveyor frames 9 and 12 are swung laterally simultaneously about their pivots 10 and 13 respectively, the pusher bars 50 and 56 are moved rearwardly endwise in unison thereby moving the rear drive sprocket 17 rearwardly the greater distance necessary to take up the additional slack introduced in the conveyor chain.

In order to compensate for the tilting motion of the rearward portion of the rear conveyor frame 12 the pusher bar 56 has inherent vertical flexibility and the pusher bar includes a flexible plate-like central portion 60 adapted to flex or bend in vertical planes as the rear conveyor frame is tilted. It will be noted that this flexible plate portion 60 extends longitudinally beneath the transverse pivot 13', as shown in Fig. 4 and is clearly shown in cross section in Fig. 5. Such flexibility of the pusher bar does not impede its reciprocatory movement since its end portions are adequately guided on the relatively tiltable parts of the rear conveyor frame. The generally rectangular open-centered end frames of the pusher bar which respectively carry the cams 52 and 53 are secured as by welding to the end portions of the central plate portion 60 (Fig. 4) and are shaped to straddle the pivots 10 and 13 of the conveyor frames, as shown in Fig. 3. The parallel side frame portions 61 of these end frames pass through suitable openings in transverse upright plates 62 and 63 of the intermediate frame 11 (Fig. 3).

Evidently the take-up arrangement described above may act on the front guide or idler at the forward portion of the conveyor instead of on the rear drive sprocket 17, with the pusher bars 50 and 56 reversed end for end so that they are moved forwardly endwise as one or both of the end portions of the conveyor are swung laterally. Also the rear drive sprocket may have a suitable guide such as an idler roll substituted therefor, with the conveyor chain then driven in other conventional manners either at its front end or intermediate its ends.

As a result of this invention an improved mechanical take-up arrangement is provided for an endless conveyor chain for taking up any slack introduced in the chain as the end frames of the conveyor are swung laterally. By the provision of the improved pusher bar arrangement the conveyor chain may be adjusted at one end portion to take up any slack introduced in the chain as the opposite end portion of the conveyor is swung laterally. By arranging the coacting pusher bars respectively on the relatively fixed intermediate frame and a laterally swingable end frame of the conveyor the conveyor chain may be automatically tensioned as the opposite ends of the conveyor are swung laterally simultaneously about their parallel upright pivots. The tensioning arrangement is located in a relatively compact manner between the upper and lower runs of the conveyor chain and is relatively rugged and simple in design, well adapted for its intended purpose. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an endless chain conveyor, swingable frame parts having lateral swinging movement relative to each other about parallel upright pivots lying in parallel vertical planes extending transversely of the conveyor, an endless conveyor chain guided for orbital circulation with its opposite end portions movable along said relatively swingable frame parts, and take-up means acting on said conveyor chain at one end portion of the conveyor and automatically responsive to swinging movement of the frame part at the opposite end portion of the conveyor for taking up any slack introduced in the chain as said frame part at said opposite end of the conveyor is swung laterally, said take-up means comprising a shiftable take-up element extending longitudinally across said vertical planes between points beyond the remote sides of such planes.

2. An endless conveyor as set forth in claim 1 wherein said shiftable take-up element of said take-up means is in the form of a mechanical pusher member actuated by lateral swinging of said frame part at said opposite end portion of the conveyor for imparting a longitudinal thrust to the conveyor chain at said one end portion of the conveyor.

3. A conveyor as set forth in claim 2 wherein said pusher member of said mechanical thrust imparting means comprises cooperating pusher bar portions having relative angular movement, one bar portion guided for longitudinal shifting movement on one of said relatively swingable frame parts.

4. The conveyor as set forth in claim 3 wherein one of said bar portions of said pusher member upon longitudinal shifting movement imparts longitudinal shifting movement to said other bar portions.

5. In an endless chain conveyor, swingable frame parts at the opposite ends of the conveyor having lateral swinging movement relative to each other, an endless conveyor chain guided for orbital circulation with its opposite end portions movable along said frame parts, and take-up means acting on said conveyor chain at one end of the conveyor and automatically responsive to swinging movement of either frame part for taking up any slack introduced in the chain as either frame part is swung laterally, said take-up means comprising cooperating pusher bars, one guided for longitudinal adjustment on one of said relatively swingable frame parts, one pusher bar upon longitudinal adjustment thereof imparting longitudinal adjustment to said other pusher bar, one of said pusher bars having cams at its opposite ends, and elements carried by said relatively swingable frame parts and respectively engaging said cams.

6. In an endless chain conveyor, a conveyor frame comprising laterally swingable end frame portions and an intermediate frame portion fixed as regards horizontal movement relative to said swingable frame portions, an endless conveyor chain guided for circulation relative to said three frame portions, and take-up means automatically responsive to swinging movement of either end frame portion for taking up any slack introduced in the conveyor chain as either end frame portion is swung laterally, said take-up means comprising take-up elements carried by said three frame portions and coacting to effect chain adjustment, at least one of said take-up elements being common to the take-up of the chain-slack during swinging of either end frame portion relative to said intermediate frame portion.

7. An endless chain conveyor as set forth in claim 6 wherein said take-up means acts on one end portion of said conveyor chain during swinging of either of said end frame portions.

8. A chain conveyor as set forth in claim 7 wherein one of said take-up elements is guided for movement on said intermediate frame portion and is actuated upon swinging of one of said end frame portions relative to said intermediate frame portion.

9. In an endless chain conveyor, a conveyor frame comprising laterally swingable end frame portions and an intermediate frame portion fixed as regards horizontal movement relative to said swingable frame portions, an endless conveyor chain guided for circulation relative to said three frame portions, and take-up means automatically responsive to swinging movement of either end frame portion for taking up any slack introduced in the conveyor chain as either end frame portion is swung laterally, said take-up means comprising take-up elements carried by said three frame portions and coacting to effect chain adjustment, one of said take-up elements comprising a pusher bar guided for longitudinal adjustment on one swingable end frame portion and with which said other elements cooperate for adjusting the chain tension as said other end frame portion is swung laterally.

10. In an endless chain conveyor, a conveyor frame comprising laterally swingable end frame portions and an intermediate frame portion relative to which said end frame portions are swingable, an endless conveyor chain guided for orbital circulation along said three frame portions with its opposite end portions movable along said swingable end frame portions, and automatic take-up means for taking up any slack introduced in the conveyor chain as either end frame portion is swung laterally comprising take-up elements carried by said three frame portions and coacting to effect chain adjustment, said take-up means including a pusher bar guided on said intermediate frame portion and a coacting pusher bar guided on one of said swingable end frame portions, said pusher bars imparting a take-up thrust to one end portion of said conveyor chain as said frame portion at the opposite end portion of the conveyor is swung laterally.

11. A conveyor as set forth in claim 10 wherein said pusher bar on one of said swingable end frame portions is actuated to effect adjustment of the conveyor chain as either end frame portion of the conveyor is swung laterally.

12. In a conveyor, a conveyor frame comprising front and rear end frame sections and an intermediate frame section with either end frame section swingable laterally relative to said intermediate frame section, an endless conveyor element guided for orbital circulation along said three frame sections and extending along the length of said conveyor frame, said endless conveyor element having upper and lower runs, and take-up means arranged between said upper and lower runs of said conveyor element and having a portion extending longitudinally of and guided on said intermediate frame section, said take-up means being automatically responsive to swinging movement of either end frame section for maintaining substantially uniform tension of said conveyor element in any of the laterally swung positions of either swingable frame section relative to said intermediate frame section.

13. In a conveyor, a conveyor frame comprising front and rear end frame sections and an intermediate frame section with either end frame section swingable laterally relative to said intermediate frame section, an endless conveyor element guided for orbital circulation along said three frame sections and extending along the length of said conveyor frame, said endless conveyor element having upper and lower runs, and take-up means arranged between said upper and lower runs of said conveyor element and automatically responsive to swinging movement of either end frame section for maintaining substantially uniform tension of said conveyor element in any of the laterally swung positions of either swingable frame section relative to said intermediate frame section, said tension maintaining means including an adjusting element lying for its full length between said upper and lower runs of said conveyor element and arranged on one swingable frame section for movement longitudinally by swinging movement of either of said swingable frame sections.

14. A conveyor as set forth in claim 13 wherein said tension maintaining means also includes a coacting adjustment element lying for its full length between said upper and lower runs of said conveyor element and arranged on said intermediate frame section for movement longitudinally upon swinging of said front swingable frame section, and means is provided for transmitting the longitudinal movement of said coacting adjusting element to said first-mentioned adjusting element.

15. A conveyor as set forth in claim 14 wherein said coacting adjusting element has cams at its opposite ends and said first-mentioned adjusting element has means actuated by one of said cams as said frame section which carries said first-mentioned adjusting element is swung laterally.

16. A conveyor as set forth in claim 15 wherein the other swingable frame section has means engaging said other cam for longitudinally moving said coacting adjusting element as said other swingable frame section is swung laterally.

17. A conveyor as set forth in claim 16 wherein said cam-engaging means on said swingable frame sections comprise cam-engaging rollers, one roller engaging each cam.

18. In an endless chain conveyor, cooperating frame parts at the opposite ends of the conveyor and having independent lateral swinging movement about parallel front and rear upright pivots relative to each other, an endless conveyor guided for orbital circulation with its opposite end portions movable along said frame parts respectively, and mechanical take-up means acting on said conveyor chain at one end portion of the conveyor and extending longitudinally forwardly of the front pivot and rearwardly of the rear pivot, said take-up means being automatically responsive to swinging movement of either frame part relative to the other for taking up any slack in the chain as either frame part is swung laterally about its pivot.

19. In an endles chain conveyor, a conveyor frame comprising an intermediate frame and swingable end frames, the latter mounted for independent lateral swinging movement relative to said intermediate frame, an endless conveyor chain guided for orbital circulation relative to said conveyor frame with its intermediate portion guided along said intermediate frame and its opposite end portions guided by said laterally swingable end frames, and take-up means acting on said conveyor chain at one end of the conveyor and automatically responsive to lateral swinging movement of either swingable end frame relative to said intermediate frame for taking up any slack introduced in the chain as either end frame is swung laterally.

20. A conveyor as set forth in claim 19 wherein said take-up means includes pusher bar means guided for longitudinal adjustment on said intermediate frame.

21. A conveyor as set forth in claim 20 wherein said take-up means includes pusher bar means guided on one of said swingable end frames and cooperating with said first-mentioned pusher bar means.

22. A conveyor as set forth in claim 21 wherein said take-up means includes cams secured to the opposite ends of said first mentioned pusher bar means and rollers carried by said swingable end frames for respectively engaging said cams, a roller as one end frame is swung laterally acting on a cam to effect longitudinal adjustment of said first mentioned pusher bar means.

23. A conveyor as set forth in claim 22 wherein one of said rollers carried by one end frame is mounted on said second mentioned pusher bar means and said first mentioned pusher bar means imparts through a cam and roller longitudinal adjustment to said other pusher bar means.

References Cited in the file of this patent
UNITED STATES PATENTS

| | | |
|---|---|---|
| 2,613,800 | Merck | Oct. 14, 1952 |
| 2,646,871 | Lundquist | July 28, 1953 |
| 2,665,794 | Slomer | Jan. 12, 1954 |